(12) United States Patent
Urban (10) Patent No.: US 12,505,641 B2
(45) Date of Patent: Dec. 23, 2025

(54) IDENTIFYING STORED PRODUCTS IN DOMESTIC STORAGE DEVICES

(71) Applicant: BSH Hausgeräte GmbH, Munich (DE)

(72) Inventor: Dieter Urban, Pfaffenhofen (DE)

(73) Assignee: BSH Hausgeräte GmbH, Munich (DE)

( * ) Notice: Subject to any disclaimer, the term of this patent is extended or adjusted under 35 U.S.C. 154(b) by 425 days.

(21) Appl. No.: 18/009,794

(22) PCT Filed: May 26, 2021

(86) PCT No.: PCT/EP2021/064016
§ 371 (c)(1),
(2) Date: Dec. 12, 2022

(87) PCT Pub. No.: WO2021/254740
PCT Pub. Date: Dec. 23, 2021

(65) Prior Publication Data
US 2023/0222769 A1    Jul. 13, 2023

(30) Foreign Application Priority Data
Jun. 15, 2020  (DE) ..................... 10 2020 207 371.6

(51) Int. Cl.
*G06V 10/44*    (2022.01)
*G06F 18/2413*    (2023.01)
(Continued)

(52) U.S. Cl.
CPC ........ *G06V 10/454* (2022.01); *G06F 18/2413* (2023.01); *G06V 10/44* (2022.01);
(Continued)

(58) Field of Classification Search
CPC .... G06V 10/454; G06V 10/44; G06V 10/764; G06V 10/82; G06V 20/68; G06V 2201/07; G06F 18/2413
See application file for complete search history.

(56) References Cited

U.S. PATENT DOCUMENTS

| 11,425,338 B2 | 8/2022 | Kang et al. |
| 2017/0050319 A1 | 2/2017 | Zhou et al. |

(Continued)

FOREIGN PATENT DOCUMENTS

| KR | 1020190108049 A | 9/2019 | |
| WO | WO-2018040105 A1 * | 3/2018 | ............. F25D 11/00 |

OTHER PUBLICATIONS

Pachon, C.G. : "Product Detection System for Home Refrigerators implemented through a Region-based Convolutional Neural Network", Int. J of Applied Engineering Research, ISSN 0973-4562, vol. 13, No. 12 (2018), pp. 10381 to 10388.

(Continued)

*Primary Examiner* — Amandeep Saini
*Assistant Examiner* — Daniella M. DiGuglielmo
(74) *Attorney, Agent, or Firm* — Laurence A. Greenberg; Werner H. Stemer; Ralph E. Locher (57) ABSTRACT

A method for identifying stored products in household storage devices. A set of images of a stored product of the storage device is captured, and the stored product is identified by evaluating image data of the set of images by a standard identification algorithm. The standard identification algorithm has been trained by way of a standard set of images captured with a standard configuration. Before the standard identification algorithm is used, a data characteristic of the image data is adapted to a standard data characteristic of the standard set of images by way of an adaptation algorithm that is at least partially trained based on a configuration of the household storage device.

11 Claims, 3 Drawing Sheets

(51) Int. Cl.
  *G06V 10/764* (2022.01)
  *G06V 10/82* (2022.01)
  *G06V 20/68* (2022.01)

(52) U.S. Cl.
  CPC ............ *G06V 10/764* (2022.01); *G06V 10/82* (2022.01); *G06V 20/68* (2022.01); *G06V 2201/07* (2022.01)

(56) References Cited

U.S. PATENT DOCUMENTS

2017/0219276 A1* 8/2017 Wang ..................... H04N 23/90
2020/0097776 A1* 3/2020 Kim .......................... G06T 7/70

OTHER PUBLICATIONS

Pal Kuntal Kumar et al., "Preprocessing for image classification by convolutional neural networks", 2016 IEEE International Conference on Recent Trends in Electronics, Information & Communication Technology (RTEICT), IEEE, May 20, 2016 (May 20, 2016), Seite 1778-1781, XP033038228, the entire document.
Xiaoqing Yin et al., FishEyeRecNet: A Multi-Context Collaborative Deep Network for Fisheye Image Rectification, arXiv:1804.04784v1, Apr. 13, 2018, p. 1-16, arXiv.org.

\* cited by examiner

IDENTIFYING STORED PRODUCTS IN DOMESTIC STORAGE DEVICES

FIELD AND BACKGROUND OF THE INVENTION

The invention relates to a method for identifying stored products in household storage apparatuses having different configurations, whereby at least one image of a stored product that is stored in a household storage apparatus is captured and the stored product is identified by evaluating image data of the at least one image by means of an identification algorithm that has been trained with respect to a set of images. The invention also relates to a household storage apparatus having at least one camera for capturing stored products and a data processing apparatus for processing image data of the images that are captured by at least one camera, wherein the data processing apparatus is configured so that it can perform the function of the adaptation algorithm in accordance with one of the preceding claims. The invention relates moreover to a system having at least one household storage apparatus and an external data processing apparatus that can be coupled in terms of data technology to at least one household storage appliance, wherein the external data processing apparatus is configured in particular so as to apply the standard identification algorithm. The invention can be advantageously applied in particular to household foodstuff handling appliances such as refrigeration appliances and cooking appliances and also cooker hoods.

Information regarding the presence of a particular foodstuff is important basic information for storage management in the household sector (for example for foodstuffs). This is performed for example in a camera-based manner with downstream object identification. For this purpose, present-day identification algorithms require an adaptation in each case to changes in the characteristic of the image data, such as are caused for example by changed appliance models or camera models as a result of changed image brightness or image distortions.

"Deep-Learning"-based identification algorithms for object identification and/or object detection based on digitized image data are prior art, cf. for example C. G. Pachón: "Product Detection System for Home Refrigerators implemented through a Region-based Convolutional Neural Network", Int. J of Applied Engineering Research, ISSN 0973-4562, Vol. 13, No. 12 (2018), Pages 10381 to 10388, US 2017/0050319 A1, KR 20190108049 A or WO 2018/40105 A1.

The adaptation to new image data is performed in the case of "Deep-Learning"-based identification algorithms by new training (so-called "re-training") the identification algorithm and means a non-inconsiderable development outlay, wherein in some cases the identification accuracy is even impaired. In certain circumstances, it is also necessary to operate appliance-specific features of the identification algorithm in parallel in order to ensure the function across all appliance models. In this case, NN ("Neural Network)-identification algorithms are trained on a certain set of data for identifying the objects that are present there. Many of these NN-identification algorithms are freely available within the scope of "Open Source" licenses. When such identification algorithms are used in separate applications, said identification algorithms are re-trained to the own set of images having new objects possibly also included therein (also referred to as "Transfer Learning"). This training is performed by adapting the parameters that are included in the NN-identification algorithm (also called "Weights") using usual methods such as gradient descent, etc. In this case, either all the weights are adapted or also weights of only a part region of the identification algorithm are adapted on a selective basis. A common minimum solution is often the adaptation or also the complete replacement of the last part of the NN-identification algorithm, of the classification algorithm or "classifiers".

The classification algorithm causes the decision that leads to the prediction or identification result. For this purpose, the classification algorithm uses so-called features that are calculated from the upstream part of the identification algorithm (the so-called "Feature Extractor") of the identification algorithm.

An NN-identification algorithm for identifying and classifying objects from image data therefore usually consists of two functional main components: the part algorithm for extracting the features from the image data (feature extraction algorithm) and a part algorithm which is downstream thereof and which uses the features to provide a prediction (the identification result) for a recognized object class (classification algorithm).

Upstream of the feature extractor are also frequently simple, hard-coded calculations of image data (so-called "Preprocessing"), for example for adapting the average image brightness or the contrast by simple calculation operations, by way of example for mean value subtraction or variance normalization.

Disadvantageously, the above adaptations of the NN-identification algorithm by re-training can only be performed in a very complex manner.

SUMMARY OF THE INVENTION

The object of the present invention is to overcome the disadvantages of the prior art at least in part and in particular to provide a better possibility for identifying stored products that are stored in a household using an identification algorithm.

This object is achieved in accordance with the features of the independent claims. Advantageous embodiments are the subject of the dependent claims, the description and the drawings.

The object is achieved by a method for identifying stored products in household storage apparatuses, whereby:
 a set of images (comprising at least one image) of stored products that are stored by means of a household storage apparatus is captured and
 the stored product is identified by evaluating image data of this set of images by means of an identification algorithm ("Standard Identification Algorithm), wherein
 the standard identification algorithm has been trained with respect to a set of images ("Standard Set of Images") that is captured in an associated configuration ("Standard Configuration"), and
 the data characteristic of the image data is adapted to a ("Standard") data characteristic of the standard set of images prior to the application of the standard identification algorithm by means of an adaptation algorithm, which is trained at least in part dependent upon a configuration of the household storage apparatus, in particular if a configuration of the household storage apparatus differs from the standard configuration.

This method provides the advantage that the same standard identification algorithm can be used for household storage apparatuses having a different configuration thereto, since an adaptation of the image data that is captured by these household storage apparatuses is performed exclusively by an upstream adaptation algorithm. Because the adaptation algorithm can be constructed in a much simpler manner than the actual identification algorithm (a few ten to a hundred parameters that are to be adapted by training in the adaptation algorithm in comparison to typically millions of parameters that are to be adapted by training in the standard identification algorithm), an adaptation outlay for different household storage apparatuses is considerably reduced, since the adaptation outlay is limited to training the adaptation algorithm. This is supported by virtue of the fact that a considerably reduced number of required training data (in other words images) is required than in the case of (re-) training the actual identification algorithm. Furthermore, an exchange of the standard identification algorithm by more precise versions is facilitated because appliance-specific (and consequently data-specific) adaptations are only included in the adaptation algorithm.

It is a further advantage that the adaptation of the data characteristic of the image data, which is generated by the household storage apparatus, to the data characteristic of the image data of the standard set of images ("Standard Data Characteristic") during subsequent processing by the standard identification algorithm can provide a better identification result than if the adaptation algorithm is not applied.

A household storage apparatus can be understood to mean fundamentally any household appliance that is provided so as to store and/or to monitor stored products. The household storage apparatus can have for this purpose at least one dedicated storage compartment but it is not essential. It is one development that the household storage apparatus is a household appliance, in particular in the sense of "white goods", especially a large household appliance. It is one development that the household storage apparatus is a foodstuff handling appliance for example a refrigeration appliance (for example a refrigerator and/or an upright freezer) and/or a cooking appliance (for example an oven and/or a hob). It is one development that the household storage apparatus is a cooker hood whose at least one camera is directed at a hob. The household storage apparatus can also be a cooker hood/hob combination. In the case of a hob, a product that is to be cooked, in particular foodstuffs, is stored on the hob, for example prior to, during and/or after a cooking process. In the case of a cooking appliance, the at least one camera can also be used for monitoring a cooking process. However, the household storage apparatus can also be a cupboard, such as a storage cupboard, a wine/air-conditioned cupboard etc.

The objects that are to be identified can be foodstuffs but are not limited thereto, rather they can be for example also dishware, laundry, general household objects etc.

The stored product can also be captured by means of a mobile user terminal, (smartphones, tablets, etc.), in particular if it is arranged on the household appliances-storage apparatus, for example if it are stored in a refrigerator or storage cupboard, placed on the hob. In so doing, this also creates a typical configuration that can be dependent, for example, on the type of household appliances-storage apparatus, on the specific illuminating conditions at the location of the household appliances-storage apparatus, on the type of mobile user terminal, on the typical accommodating height etc.

A configuration of a household storage apparatus can be understood to mean its structural construction, for example comprising a number of illuminating units, their illuminating angle, illuminating brightness and/or light spectrum, a distance and angle of the camera with respect to a storage location, camera characteristics, such as their color dynamics, resolution etc. Household storage apparatuses having different configurations can differ in these configuration parameters, for example by different types and/or positions of the camera(s), different illuminating conditions etc. In particular, different appliance modules or appliance types of the same type of household storage apparatus (for example a refrigerator) can have different configurations. That at least one image of a stored product that is stored "by means of" a household storage apparatus is captured can consequently include that at least one image of a stored product that is stored within a household storage apparatus (for example products to be refrigerated in a refrigeration appliance or food that is to be cooked in an oven) or at least one image of a stored product that is stored on a household storage apparatus, is captured (for example an image of food that is to be cooked and is on a hob).

The standard identification algorithm has been trained on a predetermined set of images (the standard set of images) of respective objects that are to be identified, wherein the images have been captured in a particular standard configuration and consequently in the image space have a typical standard data characteristic (by way of example a typical data statistic, for example the so-called statistical distribution).

It is one development that the standard set of images is a freely available set of images, for example a COCO ("Common Objects in Context") set of images.

It is one development that the standard set of images is a set of images that is generated in a dedicated manner (for example by a manufacturer of the household storage apparatus), for example said set of images is generated by means of a particular household storage apparatus. This produces the advantage that the standard configuration, under which the standard set of images has been generated, has with a greater degree of probability a smaller deviation with regard to the configurations of the different household storage apparatuses that are used in the household than a freely available set of images. This can further reduce the outlay for training the adaptation algorithm.

In general, as is fundamentally known, the identification result can not only include the type of identified object (for example "apple", "tomato") etc. but rather can also include for example their number, size and position. The identification result can be used by way of example according to a fundamentally known type for storekeeping management, for example for creating an inventory list, a shopping list, etc.

The expression that "the adaptation algorithm is trained at least in part", includes in particular that it is an algorithm according to a type of a neural network (NN-adaptation algorithm) and is not only generated as in the case of the conventional preprocessing by hard-coded parameters. The adaptation algorithm can therefore also be regarded itself as a neural network that, however, apart from regarding the adaptation and transmission of the image data does not work together with the actual standard identification algorithm and therefore does not represent a part, in particular a position, of the standard identification algorithm.

In simple cases, the adaptation algorithm can consist of an individual so-called folding layer ("Convolutional Layer"). This folding layer renders it possible to compensate for differences with regard to the standard configuration that are caused by way of example by changes in the brightness, contrast and/or color space and/or by a change in an image sharpness of the configuration.

More complex adaptation algorithms can comprise multiple NN-layers. Moreover, in addition, non-linearity and/or regularization functions can be included (for example so-called activation functions, pooling, L1-L2 regularization functions, functions to compensate for non-linear distortion such as that caused for example by non-linear compression algorithms such as JPEG, PNG, GIF or similar, where appropriate also dropout noise functions, etc.). As a result, more complex adaptations are possible, for example for correcting geometric distortions.

It is one embodiment that the standard identification algorithm comprises a feature extraction algorithm ("Feature Extractor") and a classification algorithm ("Classifier") downstream thereof. The detailed mode of operation of such an identification algorithm is known from the prior art.

Alternatively, the standard identification algorithm can include for example so-called "Template matching" that relates to cross-correlation, for example using the sum of absolute differences of image points (SAD: "Sum of Absolute Differences").

It is one development that the feature extraction algorithm and/or the classification algorithm represents or is a neural network. Such a NN-identification algorithm typically has a multiplicity of layers that are arranged one behind the other or "layers" (so-called "Deep Learning"), by way of example using VGC ("Visual Geometry Group")-, R-CNN ("Regions with Convolutional Neural Networks")-, SSD ("Single Shot multibox Detector")-, YOLO ("You Only Look Once")-architectures, etc.

It is one development that the feature extraction algorithm and/or the classification algorithm are an algorithm that relates to methods of machine vision (can also be referred to as "Computer Vision Algorithm). This can use for example SURF ("Speeded up Robust Features")-, HOG ("Histogram of Oriented Gradients")-architectures etc.

It is one embodiment that the adaptation algorithm for household storage apparatuses whose configuration does not correspond to the standard configuration is trained in cooperation with the standard identification algorithm. The training can be performed in this case in particular in such a manner that initially one or typically multiple images of an object that is to be identified are captured by means of the household storage apparatus. The associated image data is initially processed by the adaptation algorithm that is to be trained, and then by the standard identification algorithm. Following on, the parameters or weights of the adaptation algorithm are adapted in order to improve the identification result. This sequence corresponds to a fundamentally known so-called "back propagation", wherein however only a few or all parameters of the adaptation algorithm are varied. The parameters of the standard identification algorithm remain in contrast in particular unchanged ("frozen").

It is one embodiment that the adaptation algorithm is a fully trained algorithm, in other words none of its parameters are hard-coded. This advantageously avoids creating hard-coded parameters.

It is one development that a part of the parameters of the adaptation algorithm is hard-coded and another part has been trained according to methods of a neural network. This can also be expressed in such a manner that the adaptation algorithm comprises in part hard-coded conversion rules (has been "engineered"), which comprise for example physical deviations between the household storage apparatus of the configuration in the case of the capture of the standard set of images. These hard-coded conversion rules can correspond to conversion rules that have otherwise been provided within the scope of preprocessing.

It is one embodiment that a set of images of a stored product that has hitherto not yet been classified is captured by means of a household storage apparatus, and with reference to this set of images the standard identification algorithm is configured (for example trained or programmed) with regard to the identification of the associated stored product. This is particularly advantageous if a user wishes a hitherto non-classified object to be identified by means of its household storage apparatus. Due to the use of the adaptation algorithm, the user only needs for this purpose to capture comparatively few images and, where appropriate, send them together with an object description to a suitable entity for the adaption of the algorithm. The adaptation of the classification algorithm can be performed automatically, in particular on the basis of the image data of the set of images that is uploaded by the user, said image data being adapted by means of the associated adaptation algorithm. Since the appliance-specific characteristics of the household storage apparatuses are included in the respective adaptation algorithm, whereas the adapted image data is practically appliance non-specific, the adaptation of the classification algorithm in the standard identification algorithm can be readily advantageously used also for household storage apparatuses having different configurations. In other words, if for example a user captures images of a hitherto non-classified object by means of their household storage apparatus of a particular configuration and if the classification algorithm is adapted on the basis of all household storage apparatuses used, the hitherto non-classified object can also be identified by household storage apparatuses having other configurations. The user of the other household storage apparatuses does not need to do anything for this purpose. Thus, the advantage is achieved that it is possible for household storage apparatuses having different configurations to expand an appliance-independent object database or stored goods database in a particularly simple manner using the above described user-side object classification.

In addition to the above statements, it is fundamentally also possible to perform adaptations of the adaptation algorithm (by re-training) in combination with optimization of parts of the identification algorithm. For this purpose, the parts of the identification algorithm that are to be re-trained advantageously have only comparatively few free parameters that are to be adapted, for example a few ten or hundred free parameters. This development is particularly advantageous if the identification algorithm is integrated into the household storage apparatus.

The object is also achieved by a household storage apparatus having at least one camera for capturing a set of images of stored products and a data processing apparatus for processing image data of this set of images, wherein the data processing apparatus is configured in such a manner that it can apply the adaptation algorithm as described above. The household storage apparatus can be configured in a similar manner to the method, and vice versa, and has the same advantages. In this variant of the household storage apparatus, the adaptation algorithm corresponds in other words to an appliance function. This can also be described in such a manner that the adaptation algorithm is integrated or "embedded" in the apparatus. The data processing apparatus can be accordingly programmed or hardwired for this purpose.

It is one development that the feature extraction algorithm and/or the classification algorithm are also integrated into the household storage apparatus. As a result, a classification of objects whose image has been captured can be advantageously performed even without a data connection to an external data processing apparatus. This is therefore also advantageous since the standard identification algorithm that is configuration non-specific or appliance non-specific remains unchanged. The reason for this is that under certain conditions it is a particularly complex process to port an identification algorithm, which is developed using usual PC-based tools, to an embedded architecture (having in general a clearly reduced calculating capacity), for example since parameters and data typically must be converted from a floating point arithmetic to a fixed point arithmetic. This outlay is considerably reduced for the less complex adaptation algorithm than for the identification algorithm or is possibly not even necessary owing to the reduced calculation complexity.

The object is moreover achieved by a system having at least one household storage apparatus, as described above, and having an external data processing apparatus that can be coupled in terms of data technology to at least one household storage apparatus, wherein the external data processing apparatus is configured so as to apply at least the standard identification algorithm. The advantage is thus achieved that the household storage apparatus can be configured in a particularly simple and cost-effective manner. The system can be configured in a similar manner to the method, and vice versa, and has the same advantages.

In the case of this system, in one development the adaptation of the image data to the standard set of images (for example to its data characteristic) can be performed by the household storage apparatus, the adapted image data can be sent to the external data processing device, where an object identification is performed by means of the standard identification algorithm, and the result of the object identification can be reported back to the household storage apparatus.

With regard to the coupling in terms of data technology to the external data processing apparatus, the household storage apparatus can have at least one corresponding—for example wireless or wire-connected—communication facility, for example a Bluetooth module, a WLAN module, an Ethernet module etc.

The external data processing apparatus can be for example a network server or a so-called "cloud computer".

However, fundamentally any distributions of the adaptation algorithm, of the feature extraction algorithm and/or of the classification algorithm to the household storage apparatus and to the external data processing apparatus are possible.

Thus, the object is achieved furthermore by a system having at least one household storage apparatus, having at least one camera for capturing a set of images of stored products and an external data processing apparatus that can be coupled in terms of data technology to at least one household storage apparatus, wherein the external data processing apparatus is configured so as to apply the adaptation algorithm and the standard identification algorithm as described above. As a result, the advantage is achieved that the adaptation algorithm can be exchanged in a particularly flexible manner, for example an older version can be exchanged against a new version. In addition, the household storage apparatus can be equipped as a result in a particularly simple manner. Also this system can be configured in a similar manner to the method, and vice versa, and has the same advantages.

This system can be implemented in such a manner that a set of images of the stored product that is to be identified is captured by means of a household storage apparatus and sent to the external data processing facility, where appropriate together with its configuration or an identification which identifies the household storage apparatus or its configuration. The external data processing facility uses the configuration or identification to search for the matching adaptation algorithm and performs an object identification. Since the adaptation algorithm comprises few free parameters in comparison to the standard identification algorithm or has a small data size, a high number of different adaptation algorithms can be held readily available by the external data processing facility.

In one development, it is possible to use in lieu of different adaptation algorithms in the external data processing facility a single more complex adaptation algorithm (for example having multiple NN-layers) which, with reference to a set of images that has been input or with reference to the associated data characteristic, itself identifies under which configuration the set of images has been captured and automatically adapts itself to the self-identified configuration, for example by using values of parameters that are associated with the configuration. Where information is available regarding the appliance model (configuration), this information can be also used advantageously. It is advantageous in particular for this development if the adaptation algorithm has an identical structure or architecture.

It is also possible that the adaptation algorithm converts a configuration that is hitherto unknown to said adaptation algorithm or data characteristics that are hitherto unknown to said adaptation algorithm into the desired standard data characteristic, in that said adaptation algorithm detects the data characteristic of the set of images that has been input and automatically adapts itself in such a manner that the standard data characteristic is at least approximately achieved.

The above-described characteristics, features and advantages of this invention and the manner in which these are achieved will become clearer and more easily understood in connection with the following schematic description of an exemplary embodiment that is explained in detail in connection with the drawings.

DETAILED DESCRIPTION OF THE INVENTION

Figure 1:
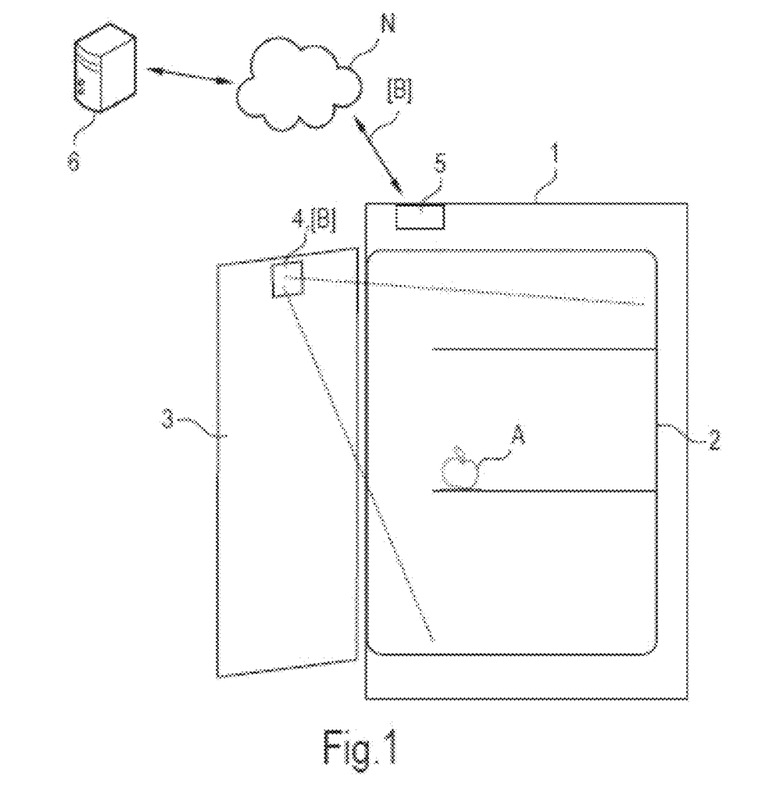
FIG. 1 shows a sketch of a household storage apparatus in the form of a refrigerator.

FIG. 1 illustrates a sketch of a household storage apparatus in the form of refrigerator 1. The refrigerator 1 has a refrigeration compartment 2 that is provided for storing stored products in the form of products to be refrigerated (in this case: foodstuffs in the form of an apple A). By way of example, a camera 4 (also referred to as CIF, "Camera in Fridge") is provided in a door 3 of the refrigerator 1 and it is possible by means of said camera to capture a set of images [B] having one or multiple images of the content of the refrigeration compartment 2. If the set of images [B] has multiple images, these can be chronologically captured (for example as a sequence of images or video) or can be captured in a non-chronological manner.

The structural construction of the refrigerator 1 can be referred to as configuration K1.

In one variant, the refrigerator 1 has a data processing facility (not shown), which renders it possible to process image data of the set of images [B].

In an additional or alternative variant, the refrigerator 1 is equipped with a communication facility 5 (for example a Bluetooth module or a WLAN module), which renders it possible for the refrigerator 1 to exchange data with an external data processing facility 6, for example to send the set of images [B] to the external data processing facility 6, to receive identification results RES (cf. FIG. 3), etc. The data connection can be created for example via the Internet N. The external data processing facility 6 can be a network server or a cloud computer.

Figure 2:
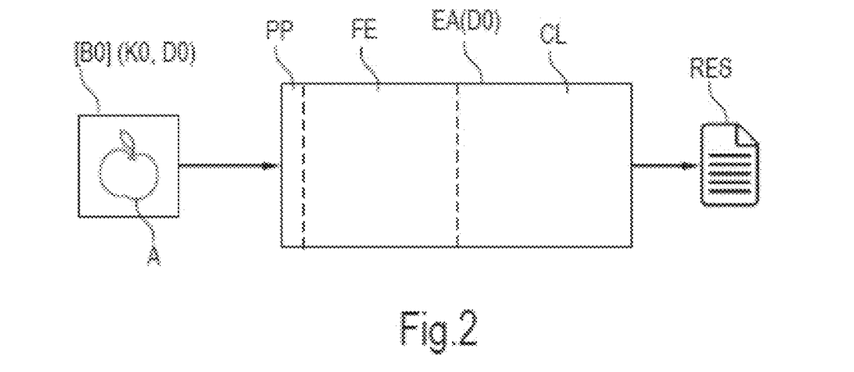
FIG. 2 shows a sketch of a conventional method for object identification.

FIG. 2 illustrates a sketch of a conventional method for object identification. A set of images [B0] that is captured under a configuration K0 and has a data characteristic D0 is fed into an identification algorithm EA that has been trained to identify objects such as the apple A under the configuration K0. As a result, the identification algorithm EA is appliance-specific. It comprises in this case a feature extraction algorithm FE and a classification algorithm CL, optionally also an upstream hard-coded pre-processing algorithm PP.

The identification algorithm EA provides a prediction (result RES) of the type "An apple has been identified with 95% probability, an orange with 70%, . . . ") or the same in connection with position information: "At position x=100, y=150, an apple has been identified with 95% probability, . . . ") and usually also with size information such as "in the region x=100 to 150, y=150 to 210 . . . has been identified").

The identification algorithm EA functions efficiently using image data that is generated from sets of images [B0], said data having an identical data characteristic D0 (for example in the form of the statistical distribution) as the sets of images that are used for training the identification algorithm EA.

When sets of images are used that are generated in a configuration K0 other than the trained configuration K0 (for example having a different appliance model or having a different camera), the data characteristic, however, no longer corresponds to that which has been used for training the identification algorithm. On the contrary, each appliance model or configuration in general provides image data having a different characteristic.

This then applies in particular if the identification algorithm EA has been trained with freely available sets of images (for example COCO), which as far as the data characteristic is concerned have less to do with that by means of a household storage apparatus. The reasons for this are, for example, different degrees of brightness, contrast and/or color space displacements of image data but also different geometric distortions or distortions of a different type (for example chromatic artifacts as a result of chromatic aberration or a color crosstalk in CMOS sensors). This usually leads to a (mostly significant) poorer identification accuracy, even if the set of images that is used for the training comprises precisely the same objects that are to be identified.

Usually, the accuracy for a household storage apparatus is improved by re-training the identification algorithm EA. For this purpose, new sets of images having the configuration of the respective household storage apparatus are generated for respective objects (such as the apple A) that are to be identified, and said new sets of images then have a dedicated data characteristic. For this purpose, a similar, typically high number of images is generated as in the case of the original set of images. However, this is complex and must be performed individually for different refrigerators or other storage apparatuses.

Figure 3:
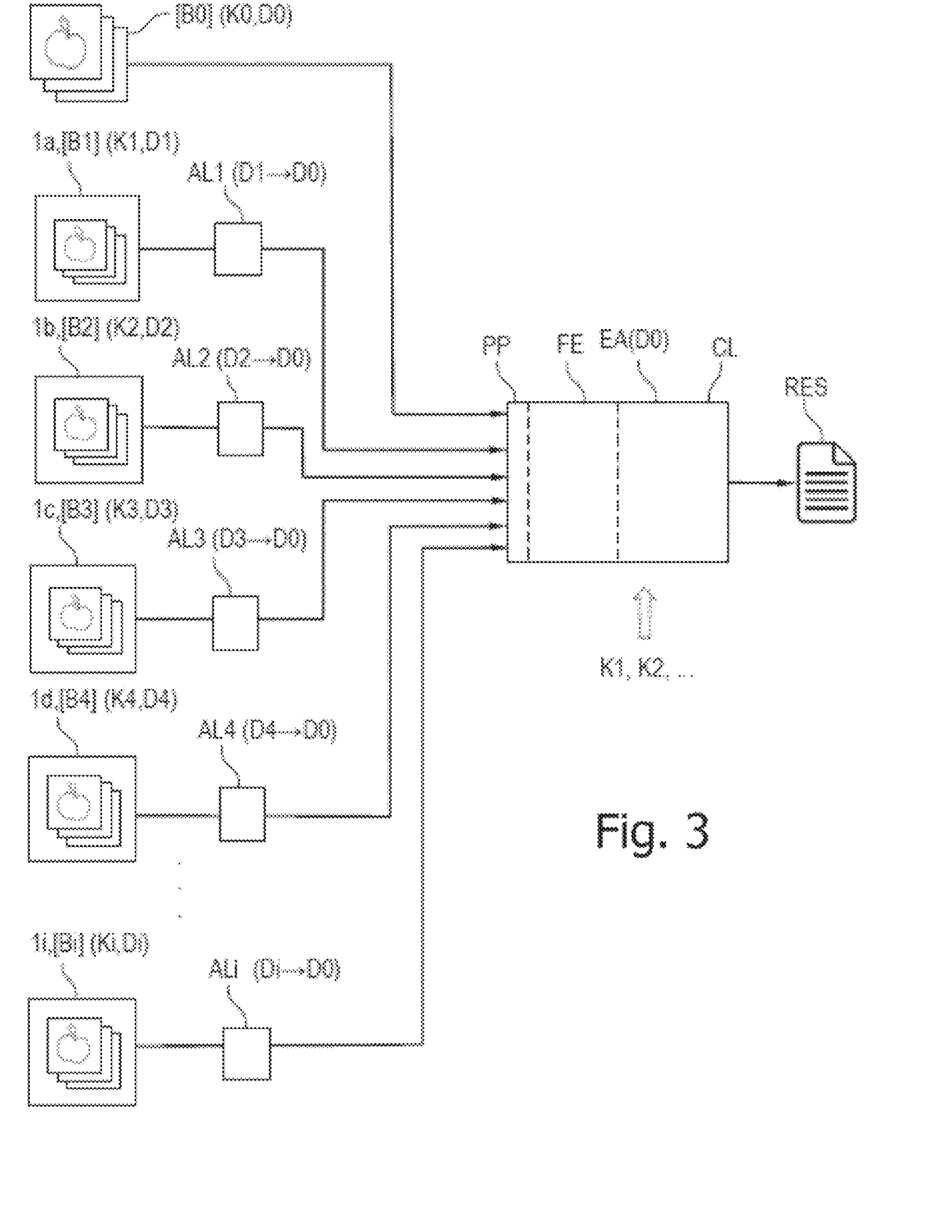
FIG. 3 shows a sketch of the method in accordance with the invention for object identification.

FIG. 3 illustrates a sketch of the method in accordance with the invention, for object identification for a system having multiple household storage apparatuses 1a to 1i having different configurations K1 to Ki. The household storage apparatuses 1a to 1i can include for example refrigeration appliances having a different configuration, for example a refrigerator 1a and a different refrigerator 1b (of which at least one can be configured identically or in a similar manner to the refrigerator 1 described in FIG. 1), one or multiple household cooking appliances 1c, a cooker hood 1d or a flue (where appropriate in combination with a hob), storage cupboard 1i etc. It is possible by means of household storage apparatuses 1a to 1i to generate respective sets of images [B1] to [Bi], which have for example corresponding data characteristics D1 to Di.

The method uses as previously a ("standard") identification algorithm EA that has been trained with reference to a standard set of images [B0], (for example a COCO set of images or a set of images that is generated by a manufacturer of the household storage apparatuses 1a to 1i). The standard set of images [B0] has been generated under a configuration K0, which differs from the configurations K1 to Ki, whereby its image data has a standard data characteristic D0. A respective adaptation algorithm AL1 to ALi is interposed between the standard identification algorithm EA for each of the household storage apparatuses 1a to 1i and said respective adaptation algorithm is used to adapt the sets of images that are captured by the household storage apparatuses 1a to 1i or their data characteristics D1 to Di to the standard set of images [B0] or its data characteristic D0. The adaptation algorithm AL1 to ALi transforms for this purpose the data characteristics D1 to Di of the sets of images [B1] to [Bi] into a distribution which is similar to the standard data characteristic D0 of the standard set of images B0. As a result, in the case of an unchanged standard identification algorithm EA, the same identification accuracy is again achieved at least approximately.

If the standard set of images [B0] has been generated by means of a household storage apparatus (not shown), it is possible to forego an adaptation algorithm for such a household storage apparatus, since the standard identification algorithm EA has already been trained with reference to this household storage apparatus.

In one variant, the standard identification algorithm EA is run on the external data processing facility 6. The adaptation algorithm AL1 to ALi are run in the respective associated storage apparatuses 1a to 1i.

In a further variant, the standard identification algorithm EA can be run in the storage apparatuses 1a to 1i, for example as an "embedded" algorithm. Moreover, the adaptation algorithm AL1 to ALi is likewise run in the respective associated storage apparatuses 1a to 1i.

In a still further variant, the adaptation algorithms AL1 to ALi and the standard identification algorithm EA are run in the external data processing facility 6. This can be implemented in such a manner that a set of images [B1] to [Bi] is captured by means of a household storage apparatus 1a to 1i and is transmitted to the external data processing facility 6, in particular together with the associated configuration K1 to Ki or an identification which identifies the household storage apparatus 1a to 1i or its configuration K1 to Ki (as indicated by the dotted arrow). With reference to the configuration K1 to Ki or the identification, the external data processing facility 6 searches for the matching adaptation algorithms AL1 to ALi and performs an object identification. Since the adaptation algorithms AL1 to ALi comprise few free parameters in comparison to the standard identification algorithm EA or has a small data size, a high number of different adaptation algorithms AL1 to ALi can be held readily available by the external data processing facility.

Figure 4:
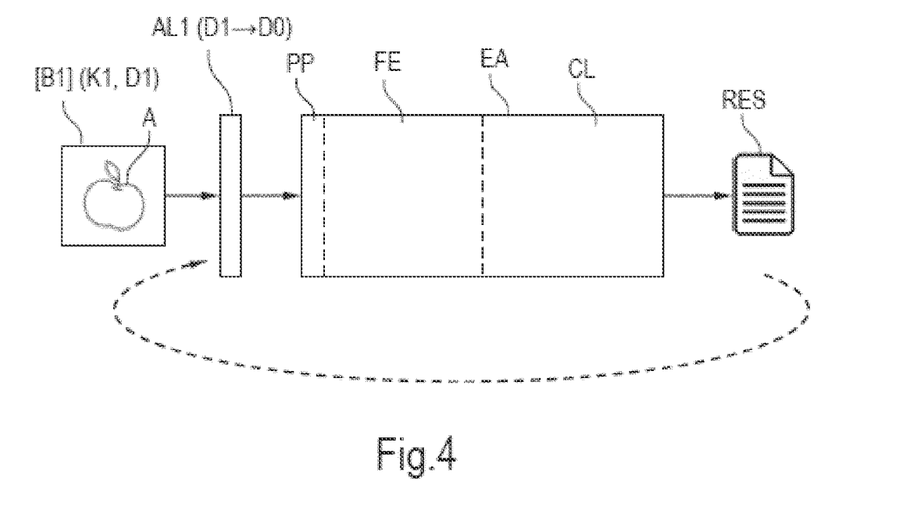
FIG. 4 shows a training sequence for training an adaptation algorithm.

In one variation of the latter mentioned variant, it is possible to use in lieu of the different adaptation algorithms AL1 to ALi a single more complex adaptation algorithm AL (for example having multiple NN-layers), which, with reference to a set of images [B1] to [Bi] that has been input or with reference to the associated data characteristics D1 to Di, itself identifies under which configuration K1 to Ki the set of images [B1] to [Bi] has been captured and automatically adapts itself to the self-identified configuration K1 to Ki, FIG. 4 illustrates a training sequence for training any selected adaptation algorithm AL1. For this purpose a set of images [B1] having advantageously multiple images is fed into the still untrained adaptation algorithm AL1 which converts the associated image data in such a manner that its data characteristic D1 is approximately as close as possible to the standard data characteristic D0. The image data that is converted in this manner is fed into the standard identification algorithm EA which provides an identification result RES. This identification result RES is initially probably less accurate than the identification result that the standard identification algorithm EA that has been left unchanged ("frozen") provides for the standard set of images B0. Following on, the adaptation algorithm AL1 is trained, for example by back propagation (as indicated by the dashed arrow), by way of example until the identification result RES corresponds at least to the identification result for the standard set of images B0.

Since the adaptation algorithm AL1 with respect to its structure and number of the parameters that are to be optimized is considerably less complex than the standard identification algorithm EA (a simple version of the adaptation algorithm AL1 can comprise for example approx. 10 to 1000 free parameters, whereas the standard identification algorithm EA has approx. 1000 to a million free parameters), advantageously only comparatively few of the otherwise required image data items are necessary for this purpose. Also, under certain circumstances training can be required with only a part quantity of the objects that are identified by the standard identification algorithm EA.

It goes without saying that the present invention is not limited to the illustrated exemplary embodiment.

In general, the terms "a", "an" etc. can be understood to mean a single number or a plurality, in particular in terms of "at least one" or "one or multiple" etc., as long as this is not explicitly excluded, for example by the expression "precisely one" etc.

Also, a number specification can include precisely the indicated number as well as a usual tolerance range, as long as this is not explicitly excluded.

LIST OF REFERENCE CHARACTERS

1a Refrigerator
1b Refrigerator
1c Household cooking appliance
1d Cooker hood
1i Storage cupboard
2 Refrigeration compartment
3 Door
4 Camera
5 Communication facility
6 External data processing facility
A Apple
AL1-Ali Adaptation algorithm
[B0] Standard set of images
[B1]-[Bi] Sets of images
CL Classification algorithm
D0 Standard data characteristic
D1-Di Data characteristics
EA Identification algorithm
FE Feature extraction algorithm
K0 Standard configuration
K1-Ki Configurations
PP Pre-processing algorithm
RES Identification result
N Internet

The invention claimed is:

1. A method for identifying stored products in household storage apparatuses, the method comprising:
capturing a set of images of a stored product that is stored by a household storage apparatus and identifying the stored product by evaluating image data of the set of images with a standard identification algorithm;
the standard identification algorithm having been trained with a standard set of images that was captured under a standard configuration; and
prior to applying the standard identification algorithm, adapting a data characteristic of the image data to a standard data characteristic of the standard set of images by way of an adaptation algorithm that is trained, at least in part, in dependence on a configuration of the household storage apparatus, and the identifying the stored product by evaluating the image data of the set of images with the standard identification algorithm.

2. The method according to claim 1, wherein the standard identification algorithm comprises a feature extraction algorithm and a classification algorithm, which have been trained with respect to the standard set of images.

3. The method according to claim 1, wherein the adaptation algorithm has been trained in coordination with the standard identification algorithm for household storage apparatuses whose configuration does not correspond to the standard configuration upon a capture of the standard set of images.

4. The method according to claim 1, wherein the adaptation algorithm includes a portion of parameters that are hard-coded and another portion that has been trained according to processes of a neural network.

5. The method according to claim 1, wherein the adaptation algorithm has been fully trained according to processes of a neural network.

6. The method according to claim 1, which comprises:
capturing a given set of images of a given stored product that has not yet been classified by the household storage apparatus; and
configuring the standard identification algorithm with reference to the given set of images so as to identify the given stored product.

7. A household storage apparatus, comprising:
at least one camera for capturing a set of images of stored products;
a data processor for processing image data of the set of images, said data processor being configured to perform the adaptation algorithm according to the method of claim 1.

8. The household storage apparatus according to claim 7, wherein the household storage apparatus is an appliance selected from the group consisting of:
a refrigeration appliance,
an oven,
a cooker hood, and
a cupboard.

9. A system, comprising:
at least one household storage apparatus having at least one camera for capturing a set of images of stored products; and
an external data processor to be coupled for data communication with said at least one household storage apparatus;
said external data processor being configured to apply the adaptation algorithm and the standard identification algorithm according to the method of claim 1.

10. The system according to claim 9, wherein the external data processor holds available an adaptation algorithm that is configured, with reference to a data characteristic of a set of images that has been input, to self-identify under which configuration the set of images has been captured and to automatically adapt itself to the self-identified configuration.

11. A system comprising:
a household storage apparatus having a camera for capturing a set of images of stored products that are stored in said household storage apparatus;
a data processor for processing image data of the set of images for identifying a stored product by evaluating image data of the set of images;
an external data processor to be connected for data communication with said household storage apparatus;
wherein, prior to applying a standard identification algorithm for identifying the stored product, adapting a data characteristic of the image data to a standard data characteristic of a standard set of images by way of an adaptation algorithm that is trained, at least in part, in dependence on a configuration of said household storage apparatus;
wherein the standard identification algorithm has been trained with a standard set of images that was captured under a standard configuration; and
wherein said data processor is configured to perform the adaptation algorithm and said external data processor is configured to apply at least a part of the standard identification algorithm.

* * * * *